United States Patent [19]

Toyama

[11] 4,272,685
[45] Jun. 9, 1981

[54] GENERATING MEANS

[76] Inventor: James Toyama, 1980 Cedar Ave., Long Beach, Calif. 90806

[21] Appl. No.: 752,874

[22] Filed: Dec. 20, 1976

[51] Int. Cl.³ .............................................. F01D 15/10
[52] U.S. Cl. ....................................... 290/52; 415/91; 416/188
[58] Field of Search ........................... 290/52; 415/91; 416/188, 189, 195

[56] References Cited

U.S. PATENT DOCUMENTS

| 622,474 | 4/1899 | Hoskin | 290/52 |
| 2,509,442 | 5/1950 | Matheisel | 415/91 |
| 2,724,082 | 11/1955 | Hornfeck | 290/52 |
| 2,929,937 | 3/1960 | Kroger | 290/52 |

Primary Examiner—Stanley J. Witkowski
Assistant Examiner—John W. Redman
Attorney, Agent, or Firm—Blair, Brown & Kreten

[57] ABSTRACT

A generating means as a form of utilizing water to generate electricity. There is a water dam which backs up a sizeable depth and water pressure, and a water outlet pipe near the bottom of the dam. A plurality of electric generating stations are positioned below the dam and utilize water flow through the outlet pipe to drive an electric generator at each station.

1 Claim, 6 Drawing Figures

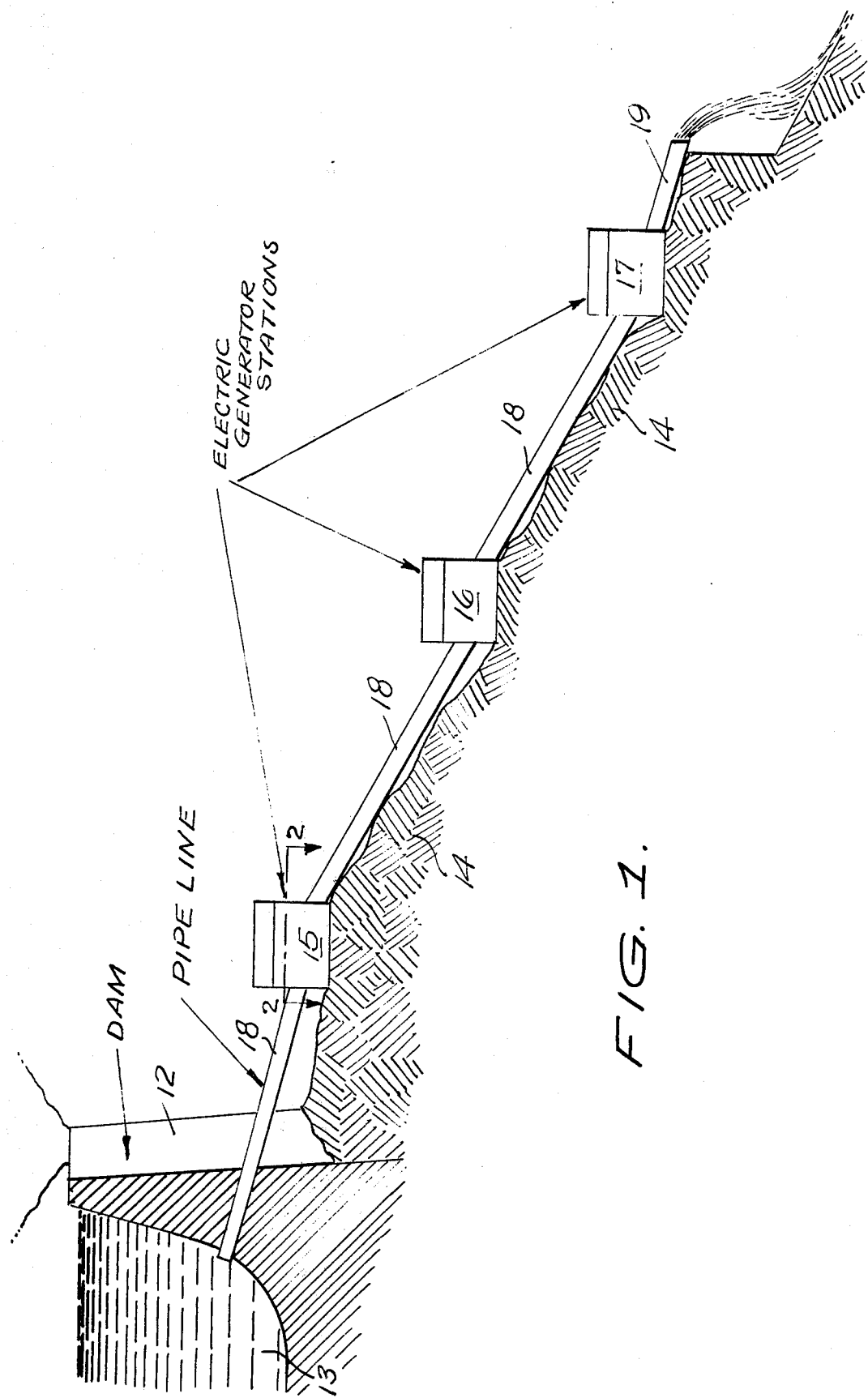

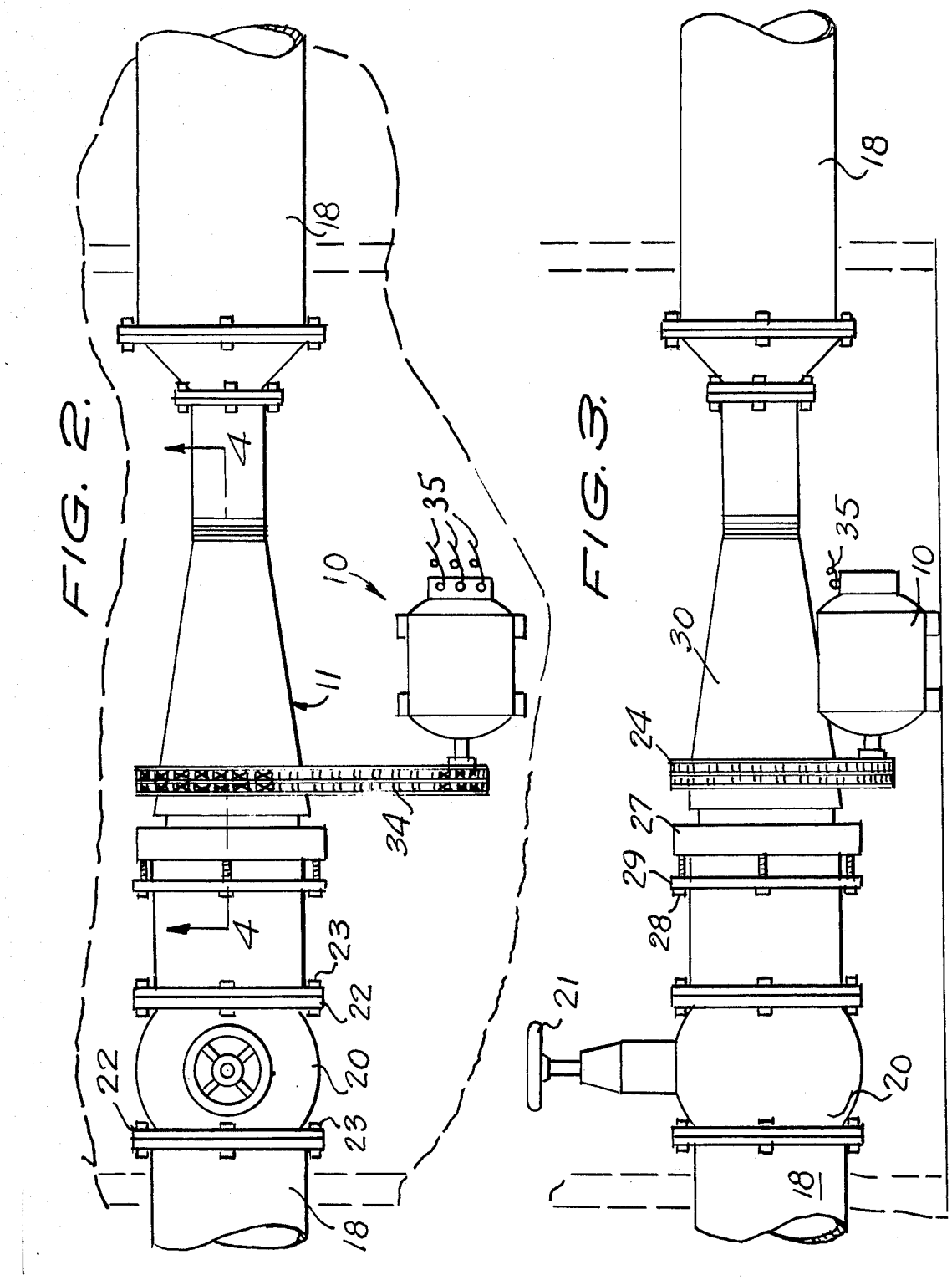

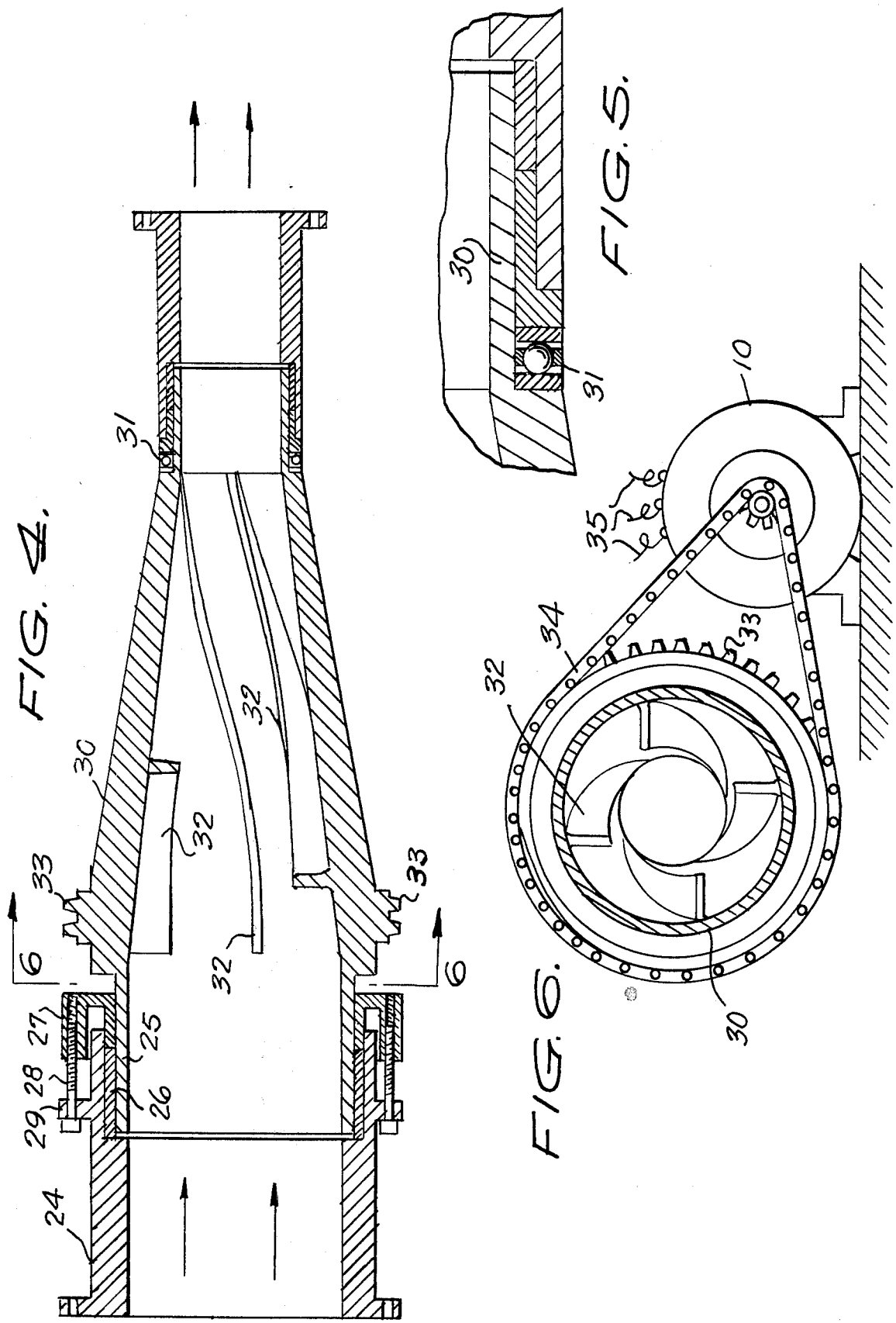

4,272,685

GENERATING MEANS

BACKGROUND OF THE INVENTION

Field of the Invention

The present invention relates to generators for building up electricity rapidly, extensively and inexpensively.

There is always a desire for power sources to be used to drive electrical generating means. The more inexpensive while at the same time exhibiting power to rotate the generator is a most long sought for device.

SUMMARY OF THE INVENTION

The present invention of a means for generating electricity includes a dam which backs up water to a relatively good height, and there is a water flow pipe near the base of the dam for a relatively high flow of water. A plurality of generating stations are spaced along a downward sloping hill from below the dam to utilize water flowing through the pipe. At each generating station the water flows through a turbine where water flows through a restricted area, and the rotating turbine is chain connected to a highly efficient electrical generator. The turbine blades which rotate under the influence of water passing through the narrow area, turn at a high revolution to drive the generator, and then the water exhausts down the hill to another station to drive another generator.

The primary object of the invention is to provide a water driven turbine means to drive an electric generator and produce electrical power.

Other objects and advantages will become apparent in the following specification when considered in light of the attached drawings.

BRIEF DESCRIPTION OF THE DRAWINGS

FIG. 1 is a large elevation view of a dam for water and a plurality of stations on a downhill slant;

FIG. 2 is a sectional plan view of a water turbine and electrical generator;

FIG. 3 is an elevation view of the turbine and electrical generator;

FIG. 4 is a view taken along the line 4—4 of FIG. 2 looking in the direction of the arrows;

FIG. 5 is an enlarged sectional view of one of the bearings; and

FIG. 6 is a view taken along the line 6—6 of FIG. 4, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally an electrical generator which is rotated under the influence of a water driven turbine indicated generally at 11.

At this point refer back to FIG. 1 first to observe an overall set up for the generating means, and how it is set up. There is shown a dam 12 with a substantial height of water 13 held in storage behind the wall of the dam 12. From an engineering knowledge a high depth of backed-up water comprises a storage of energy.

Extending in a downward sloping hill 14 there is a sizeable fall of water below dam 12. A plurality of electric generating stations 15, 16 and 17 are built along the surface of hill 14, with each one at a lower level than the previous one, and any number may be chosen. Perforating the lower portion of the wall of dam 12 there is a flow pipe 18 which conducts water down through station 15, then 15 and 17, and finally an exhaust pipe 19, attached to the lowest station 17 pours water over the edge of the hill.

Structure of the water turbine 11 and electricity generator 10 are shown in detail in FIGS. 2 through 6. The water flow pipe 18 is connected to a rather large hand controlled valve 20, the valve 20 having a hand wheel 21 to move an internal blade (not shown) to thereby adjust the volume of water flow being fed to the turbine 11. Circular face plates 22 are fastened by a plurality of bolts 23 to the water flow pipe 18 and entrance to the turbine.

The water flowing through pipe 18 and valve 20 leaves the valve to pass through a short, straight, entrance section 24 that is fastened to the larger end of turbine 11. In FIG. 4 there is shown in detail that the end of housing 25 of the turbine 11 extends into the inner end of section 24, and between these two components there is a packing ring 26. A U-shaped bracket 27 reaches between housing 25 and entrance 24 to contact and press against the packing ring 26. A threaded bolt 28 works between bracket 27 and a sleeve 29 on the entrance 24 to adjust the pressure on packing ring 26 and to thereby render the junction between components as being water leakproof. It should further be noted that the packing ring 26 while being leakproof also permits housing 25 to rotate freely, as will be seen hereinafter.

Just beyond the junction between entrance 24 and housing 25, the housing has a materially thicker section 30 which then tapers toward the exhaust end of the turbine. At the smaller end there is mounted a ball bearing race 31 so that housing 30 will rotate. Within the housing 30 there are a plurality of blades 32 that are rigidly attached to and forming part of housing 30, the blades being curved and tapered and conforming to the tapered housing so that water flowing to the tapered housing and past the blades causes the housing to rapidly and freely revolve.

At the larger, and heavier, end of housing 30, and formed around the outer periphery, there are many large chain teeth 33, so that these teeth can easily pull a chain 34 that meshes with the teeth 33.

Mounted onto the floor, and placed within a short distance from turbine 11, there is located a reasonably large electricity generator 10, the generator having a toothed gear fastened to its rotatable armature so that chain 34 will mesh with the gear and rapidly rotate the generator as the turbine rotates. Output from generator 10 is produced on connecting wires 35 to some useful utilizing the current.

After water from flow pipe 18 has passed through the turbine 11, and caused the same to turn, the water is connected again to pipe 18 that is fastened to the narrow portion of the turbine output. From this area the water then flows on to the next station, and turbine, which is positioned lower than the prior station, and thus has a rapid water flow.

In the use and operation of the invention there has been a good quantity of water collected behind a hard dam 12 resulting in a high water supply 13. Thus when flow pipe 18 is mounted at the bottom of the dam 12 and thereafter slants downward, there is offered a relatively large volume of water, flowing at good high speed through the pipe 18. Water flow passes the hand adjusted valve 20, past a water-tight packing ring 26 and into the large end of housing 30 of the water turbine 11.

Turbine blades 32 are attached to the inside of housing 30, are shaped into a curved, tapering configuration, to terminate in the smaller end of the turbine. Water moving through flow pipe 18, at a high speed, causes the blades 32 and housing 30 to speed rotate at an entirely high speed. The housing 30 turns freely in packing ring 26 at one end, and also the ball bearing ring 31 at the smaller end.

Housing 30 has many teeth 33 around the outer periphery at the large end, and teeth 33 serve to carry a chain 34, this chain 34 going over and pulling the toothed armature of a generator 10. Chain 34 moves at a very high speed to produce electricity on output leads 35.

Having thus described the preferred embodiment of the invention it should be understood that numerous structural modifications and adaptations may be resorted to without departing from the spirit of the invention.

What is claimed is:

1. Apparatus for generating electricity by passing water in a pipe through a series of turbines in which the water traverses from a higher elevation to a lower elevation and in which the turbines include a water flow valve upstream of said turbine in the pipe to alter the flow rate in said pipe, said turbines comprising a housing having a conically tapering configuration truncated at the smaller extent and blades disposed on an inner surface of said housing such that said blades have a continuous, uninterrupted, spirally curved tapering configuration and terminate in the small end of said housing, said housing supported at its small end by bearings and at its large end by a packing ring which supports said housing and allows said housing to rotate, gear teeth disposed about the outer periphery of said housing at its large end, a generator having a toothed armature, and a chain connecting said gear teeth of said housing to said toothed armature so that rotation of said housing provides rotation of said armature thereby generating electricity.

* * * * *